US012679026B2

(12) United States Patent
Dudukovic et al.

(10) Patent No.: US 12,679,026 B2
(45) Date of Patent: Jul. 14, 2026

(54) MULTIMATERIAL POWDER BED PATTERNING FOR ADDITIVE MANUFACTURING METHOD

(71) Applicant: Lawrence Livermore National Security, LLC, Livermore, CA (US)

(72) Inventors: Nikola Dudukovic, Hayward, CA (US); Roger Aines, Livermore, CA (US); Sarah Baker, Dublin, CA (US); Joshua R. Deotte, Livermore, CA (US); Eric B. Duoss, Danville, CA (US); Jeremy Taylor Feaster, Fremont, CA (US); Alexandra Golobic, Oakland, CA (US); Julie Mancini, Livermore, CA (US); Christopher M. Spadaccini, Oakland, CA (US); Seth Evan Watts, Collingswood, NJ (US); Michael John Troksa, Veradale, WA (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 392 days.

(21) Appl. No.: 18/199,530

(22) Filed: May 19, 2023

(65) Prior Publication Data

US 2023/0302727 A1     Sep. 28, 2023

Related U.S. Application Data

(60) Division of application No. 16/657,601, filed on Oct. 18, 2019, now Pat. No. 11,697,246, which is a
(Continued)

(51) Int. Cl.
*B29C 64/209* (2017.01)
*B22F 10/14* (2021.01)
(Continued)

(52) U.S. Cl.
CPC ............ *B29C 64/209* (2017.08); *B22F 12/41* (2021.01); *B22F 12/53* (2021.01); *B29C 64/227* (2017.08);
(Continued)

(58) Field of Classification Search
CPC ... B29C 64/209; B29C 64/227; B29C 64/255; B29C 64/268; B29C 64/321;
(Continued)

(56) References Cited

U.S. PATENT DOCUMENTS

| 2015/0210010 A1 | 7/2015 | Napadensky |
| 2015/0298393 A1 | 10/2015 | Suarez |

(Continued)

FOREIGN PATENT DOCUMENTS

| CN | 105798299 A | 7/2016 |
| CN | 205929486 U | 2/2017 |

(Continued)

OTHER PUBLICATIONS

Xiao, Bin, and yuwen Zhang. "Laser sintering of metal powders on top of sintered layers under multiple-line laser scanning." Journal of Physics D: Applied Physics, vol. 40, No. 21, Oct. 19, 2007, pp. 6725-6734 (Year: 2007).

(Continued)

*Primary Examiner* — Galen H Hauth
*Assistant Examiner* — Mohamed K Ahmed Ali
(74) *Attorney, Agent, or Firm* — HARNESS, DICKEY & PIERCE, P.L.C.

(57) ABSTRACT

The present disclosure relates to a method for additively manufacturing a part. The method may involve using a reservoir to hold a granular material feedstock, and using a nozzle in communication with the reservoir to release the granular material feedstock in a controlled fashion from the reservoir to form at least one layer of a part. The method
(Continued)

may further involve using an excitation source for applying a signal to the nozzle which induces a controlled release of the granular material feedstock from the nozzle as needed to pattern the granular material feedstock as necessary to form a layer of the part.

15 Claims, 5 Drawing Sheets

Related U.S. Application Data continuation-in-part of application No. PCT/US2018/059808, filed on Nov. 8, 2018.

(51) Int. Cl.

| | |
|---|---|
| *B22F 10/28* | (2021.01) |
| *B22F 10/80* | (2021.01) |
| *B22F 12/41* | (2021.01) |
| *B22F 12/53* | (2021.01) |
| *B22F 12/58* | (2021.01) |
| *B29C 64/227* | (2017.01) |
| *B29C 64/255* | (2017.01) |
| *B29C 64/268* | (2017.01) |
| *B29C 64/321* | (2017.01) |
| *B29C 64/393* | (2017.01) |
| *B33Y 30/00* | (2015.01) |
| *B33Y 40/20* | (2020.01) |
| *B33Y 50/02* | (2015.01) |

(52) U.S. Cl.

CPC .......... *B29C 64/255* (2017.08); *B29C 64/268* (2017.08); *B29C 64/321* (2017.08); *B29C 64/393* (2017.08); *B22F 10/14* (2021.01); *B22F 10/28* (2021.01); *B22F 10/80* (2021.01); *B22F 12/58* (2021.01); *B33Y 30/00* (2014.12); *B33Y 40/20* (2020.01); *B33Y 50/02* (2014.12)

(58) Field of Classification Search

CPC ........ B29C 64/393; B22F 10/10; B22F 10/20; B22F 10/30; B22F 12/00; B22F 2999/00; B33Y 30/00; B33Y 40/00; B33Y 50/02

See application file for complete search history.

(56) References Cited

U.S. PATENT DOCUMENTS

| | | | |
|---|---|---|---|
| 2016/0297104 A1 | 10/2016 | Guillemette et al. |
| 2016/0307678 A1 | 10/2016 | Unosson et al. |
| 2016/0368055 A1 | 12/2016 | Swaminathan et al. |
| 2017/0087632 A1 | 3/2017 | Mark |
| 2017/0216918 A1 | 8/2017 | Orme-Marmarelis |
| 2017/0252820 A1 | 9/2017 | Myerberg et al. |
| 2018/0015666 A1 | 1/2018 | Honda |
| 2018/0290381 A1 | 10/2018 | Volkov |
| 2020/0147874 A1 | 5/2020 | Dudukovic et al. |

FOREIGN PATENT DOCUMENTS

| | | |
|---|---|---|
| CN | 108556338 A | 9/2018 |
| WO | 2016114964 A1 | 7/2016 |
| WO | 2016149032 A1 | 9/2016 |
| WO | 2017021957 A1 | 2/2017 |
| WO | 2017081040 A1 | 5/2017 |
| WO | 2017156415 A1 | 9/2017 |
| WO | 2020089548 A1 | 5/2020 |

OTHER PUBLICATIONS

International Search Report and Written Opinion from corresponding International Application No. PCT/US2018/059808, mailed Aug. 5, 2019.

International Search Report and Written Opinion from corresponding International Application No. PCT/US2020/055923, mailed Feb. 3, 2021.

MULTIMATERIAL POWDER BED PATTERNING FOR ADDITIVE MANUFACTURING METHOD

CROSS-REFERENCE TO RELATED APPLICATIONS

This application is a divisional of and claims priority to U.S. patent application Ser. No. 16/657,601, filed Oct. 18, 2019, which is a continuation-in-part of and claims priority to PCT International Application No. PCT/US2018/059808, filed Nov. 8, 2018. The entire disclosure of each of the above applications is herein incorporated by reference.

STATEMENT OF GOVERNMENT RIGHTS

This invention was made with Government support under Contract No. DE-AC52-07NA27344 awarded by the United States Department of Energy. The Government has certain rights in the invention.

FIELD

The present disclosure relates to systems and methods for additive manufacturing, and more particularly to an additive manufacturing system and method which patterns one or more types of powder material, as needed, to form the desired features of each layer of a part, in a layer-by-layer operation, and wherein the layers need not be planar.

BACKGROUND

This section provides background information related to the present disclosure which is not necessarily prior art.

Powder-based additive manufacturing processes have historically been limited to printing with a single material. In selective laser melting (SLM) or selective laser sintering (SLS), a layer of metal powder is spread across an entire build area, and solidified into a desired pattern using a laser beam that is rastered over the powder surface. The laser beam solidifies only select, desired portions of the metal powder, leaving other portions of the powdered material that are not acted on by the laser beam unaffected. This allows the unaffected powder portions of the layer to be removed thereafter. Binder jet printing involves spreading a powder layer and selectively applying a polymeric binder to desired portions of the powder layer using an inkjet-like process. The printed part is subsequently post-treated by removing the binder and sintering the metal.

However, neither of the above methods allow direct patterning of the desired features to be formed in each layer of a part using the powder material. The foregoing methods are limited to applying a powder material over the full area of the layer, and then using one or more post processing processes to permanently form the desired features of each layer.

SUMMARY

This section provides a general summary of the disclosure and is not a comprehensive disclosure of its full scope or all of its features.

In one aspect the present disclosure relates to a method for additively manufacturing a part. The method may comprise using a reservoir to hold a granular material feedstock, and using a nozzle in communication with the reservoir to release the granular material feedstock in a controlled fashion from the reservoir to form at least one layer of a part. The method may further include using an excitation source for applying a signal to the nozzle which induces a controlled release of the granular material feedstock from the nozzle as needed to pattern the granular material feedstock as necessary to form a layer of the part.

In another aspect the present disclosure relates to a method for additively manufacturing a part. The method may comprise using a reservoir to hold a granular material feedstock, and using a nozzle in communication with the reservoir to release the granular material feedstock in a controlled fashion from the reservoir to form at least one layer of a part. The method may further include using an electronic controller to control an excitation source, with the excitation source applying a signal to the nozzle which induces a controlled release of the granular material feedstock from the nozzle as needed to pattern the granular material feedstock as necessary to form a layer of the part. The method may further include using an element disposed within the nozzle for providing a controlled, vibratory mechanical signal to the granular material feedstock to assist in controlling release of the granular material feedstock from the nozzle in response to the signal generated from the excitation source.

In still another aspect the present disclosure relates to a method for additively manufacturing a part. The method may comprise using a reservoir to hold a granular material feedstock, and using a nozzle in communication with the reservoir to release the granular material feedstock in a controlled fashion from the reservoir to form at least one layer of a part. The method may further include using an electronic controller to control an excitation source, the excitation source generating at least one least one of an electrostatic signal or an electromagnetic signal to the nozzle which induces a controlled release of the granular material feedstock from the nozzle as needed to pattern the granular material feedstock as necessary to form a layer of the part. The method may further include further comprising using an element disposed within the nozzle for providing a controlled, vibratory mechanical signal to the granular material feedstock to assist in controlling release of the granular material feedstock from the nozzle in response to the signal generated from the excitation source. The method may further include using a syringe located within the nozzle to receive the granular material feedstock and controllably release the granular material feedstock.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure. In the drawings.

Corresponding reference numerals indicate corresponding parts throughout the several views of the drawings.

DETAILED DESCRIPTION

Example embodiments will now be described more fully with reference to the accompanying drawings.

The present disclosure involves using a controlled granular flow to selectively deposit a powder material to be used in forming a 3D part or component, in areas of interest of each layer of the part, in a layer-by-layer operation. The powder material can be comprised of different material classes, for example and without limitation, metals, polymers, ceramics, etc. The powder material may also be comprised of different grades/types of a given material, mixtures of different types of powders, or even a single powder material but with different particle shapes, sizes, morphologies, etc. The present disclosure enables printing 3D components with multiple powders within a single layer, including support material that can eventually be removed. The patterned multi-material powder layer can then be treated with a binder and/or sintering aids or inhibitors and post-processed. Another possibility would be to first deposit a layer of liquid binder, then pattern the powder on top of it. Alternatively or additionally, an in-situ sintering process can be incorporated into the setup, using photonic sintering (e.g., intense pulsed light sintering), or microwave sintering of each powder layer, or treating each powder layer with a laser, electron beam or other directed energy source. This significantly reduces the time and equipment requirements necessary to produce a fully sintered three-dimensional metal component.

Figure 1:
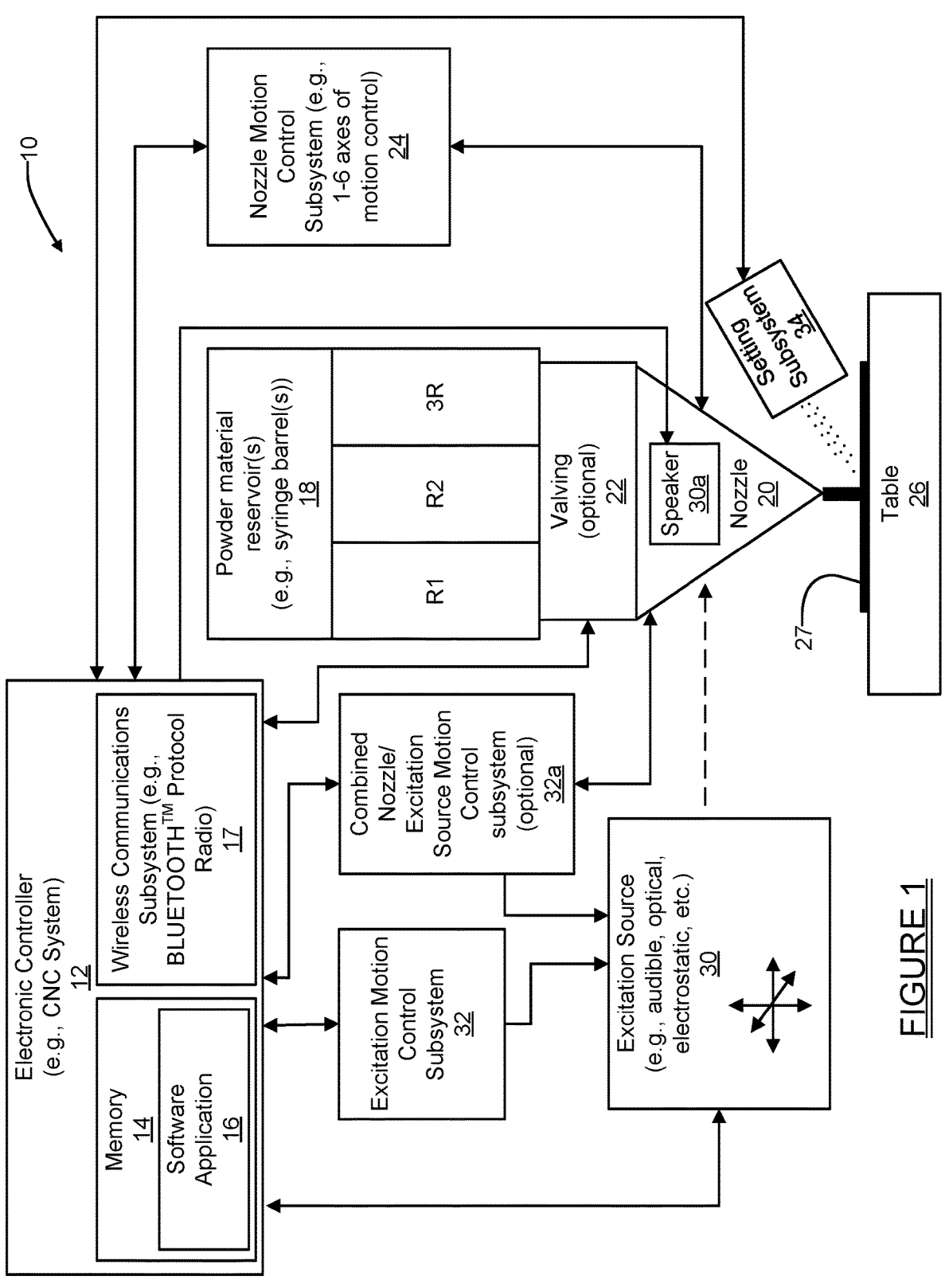
FIG. 1 is a high level block diagram showing one embodiment of a system in accordance with the present disclosure.

Referring to FIG. 1, a system 10 in accordance with one embodiment of the present disclosure is shown. The system 10 may include an electronic controller 12, for example a CNC system, having a memory (e.g., non-volatile memory such as RAM or ROM) 14 and a software program 16 used by the electronic controller 12 in controlling various other components of the system to form a 3D part. An optional wireless communication subsystem 17 may also be included as part of the electronic controller 12 or as a separate subsystem that is accessed by the electronic controller 12. In one embodiment the wireless communications subsystem 17 forms a BLUETOOTH™ protocol radio, although virtually any other wireless communications protocol may be used. The wireless communications subsystem 17 may be used to communicate wirelessly with one or more other components of the system 10, as will be described further in the following paragraphs.

The system 10 may further include a powder material reservoir 18, which may be syringe or any other suitable form of reservoir, and may optionally include two or more distinct reservoir portions for holding two or more different types of granular media. For convenience, the term "powder" will be used to denote the granular media. It will also be appreciated that the powder may be in randomly shaped particles, or it may be in the form of spherically shaped particles or any other shape, to best meet the needs of manufacturing a specific part. The system 10 is not limited to use with any shape of powder particles.

Reservoir portions R1-R3 are shown in FIG. 1, which may be used to hold different types (and/or different mixtures) of powdered material feedstock to be used in forming each layer of a 3D, multi-layer part. However, as noted above, the system 10 may be used with only a single type of powder, or possibly with more than three distinct types of powder, or even a single type of powder but in different shapes, sizes and/or morphologies. As such, the system 10 is not limited to use with any specific number of powders or any specific mixture of powdered material feedstock.

It will also be appreciated that while the use of multiple reservoirs is disclosed above, the present disclosure is not limited to using just one material (or mixture of materials) per layer of the part being formed. For example, with the system 10, one may choose to adjust mixtures from different reservoirs R1-R3 within one layer, for example to form functionally graded parts. Also two or more of the reservoirs R1-R3 could be filled with the same material (or material mixture) so that one reservoir could be dismounted and refilled while another is being used, to accommodate long print jobs without stopping the system 10 from printing. This may be important if the reservoirs 18 travel with a print head (e.g., on a system like an inkjet system) and the overall travelling weight of the print head needs to be minimized, or if the material mixture has a short shelf life in its un-cured state, and must be produced in some small batch process.

By changing the above described conditions, the flow rate, feature size, shape, continuity and other factors can be highly tuned and controlled. The choice of particle size depends upon the desired nozzle size and, hence, feature size. In most cases, particle sizes on the order of 1 micrometer to 1 mm in diameter are selected though particle sizes can fall outside this range. The choice of particle shape is also important. In most cases, spherical particles are ideal, though not necessary. Other attributes that affect printability include powder surface morphology, surface area, surface charge, density, etc.

With further reference to FIG. 1, the system 10 may also include a nozzle 20 into which a granular material feedstock is fed from the reservoirs R1-R3. The granular material feedstock may be in the form of a powdered material feedstock, and for convenience the feedstock will be referred to throughout as simply "powdered material feedstock". The nozzle 20 may have an opening of any suitable dimension, but it is expected that in many cases the nozzle will have a flow opening which is typically between about 100 um to 1 mm in diameter. The nozzle 20 essentially forms a print head which can be comprised of a wide array of feedstock materials including plastics, metals, and ceramics. Tapered, conical nozzles may be preferable, although are not absolutely necessary. Assuming that a plurality of powder reservoirs are used, then it may be helpful to include a valving system 22, controlled for example by the electronic controller 12, to control the application and/or mixing of two or more different types of powders. The powdered material feedstocks may be metallic powders, plastic powders, ceramic powders, etc., and the system 10 is not necessarily limited to use with any specific type of powdered or granular material feedstock. It will also be appreciated that some of the materials being deposited, in addition to dry granular media (e.g., powders), could be liquids (e.g., binders) or could be or WET granular media (e.g., pastes or slurries) in addition to the powders. This "hybrid" approach is believed to be unique in that one may selectively deposit different combinations of powders, liquids, binders, slurries, pastes, etc. in a single printing process. Different layers of a single part could even be made of differing combinations of the above materials.

A nozzle motion control subsystem 24 may be controlled by the electronic controller 12 and used to control movement of the nozzle 20 in one, two or more axes, or for example about X, Y and Z axes, and even more preferably about three to six different axes of motion, relative to a table 26 on which each layer 27 of the 3D part is being formed. Five or six different axes of motion control is common with present day Direct Ink Write 3D printing systems. In another implementation, shown in FIG. 2, the table 26 may be controlled for movement in the desired number of axes (e.g., anywhere from two to six) using a table motion control subsystem 28 instead of moving the nozzle 20. Optionally, both nozzle 20 movement and table 26 movement could be implemented, although in practice it is expected that, in most implementations, one of these two components will be held stationary while the other is moved as needed to form each layer of the 3D part.

The system 10 described herein could also be used to deliver particles "just in time" to be sintered, for example on a non-planar substrate, thus removing the powder bed entirely. Rotations might also be useful to allow powder delivery and directed energy access substantially simultaneously. Also, it will be appreciated that the axes of movement need not be perpendicular so long as they are not parallel; that is, for example, one could have a perfectly well behaved XY system with axes at 0 and 60 degrees, which will cover the plane despite not having perpendicular axes. Still further, another possible positioning mechanism for the system 10 may involve the use of a hexapod-like mounting where the position and rotation of the part or powder bed is controlled by linear actuators that are not perpendicular to each other. Thus, the system 10 is not limited to use with a two or three axis positioning mechanism, but may incorporate any of the aforementioned positioning systems and/or controls, which provide anywhere from two to six, or possibly even more than six, degrees of motion.

The system 10 further includes an excitation source 30 which may be used to generate an excitation signal that induces a flow of the powdered material from the nozzle 20 as needed to form the required features of a given layer of the 3D part being. The flow may be achieved by inducing a slight oscillatory motion in the nozzle 20 using the excitation signal, or possibly even by inducing an oscillatory motion of the powdered material feedstock within the nozzle by using the excitation signal but without any tangible vibration of the nozzle itself. The flow may also be achieved by a mechanical screw-driven flow or via a different delivery method that allows ready start/stop operation. In most instances, it is expected that inducing a slight oscillatory motion or vibration of the nozzle 20 will be preferred. Optionally, the excitation source 30 may be controlled using wireless signals from the wireless communications subsystem 17.

The excitation source 30 may be moved in a controlled fashion by an excitation motion control subsystem 32 that moves the excitation source 30 in two or more axes as needed to control the release of the powdered material feedstock from the nozzle 20. Optionally, the movement of both the nozzle 20 and the excitation source 30 may be controlled by a combined nozzle/excitation source motion control subsystem 32a, or the excitation source 30 may be slaved to movement of the nozzle 20. Whether separate motion control subsystems 24 and 32 are used, or a single motion control subsystem is used to move both the nozzle 20 and the excitation source 30, may depend on the degree of motion/movement control required for the excitation source 30, as well as other factors. As another option, a mechanical connection between the excitation source 30 and the nozzle 20 may be used so that the nozzle could be oscillated mechanically in a controlled way to control the release of material.

In one implementation the excitation signal emitted from the excitation source 30 may be an acoustic signal emitted from a transducer such as a tunable speaker positioned in reasonable proximity to the nozzle 20 (e.g., within 1-15 mm). If an acoustic signal is used as the excitation signal, then one or more of the frequency, the amplitude or the direction of propagation of the acoustic signal may be controlled to induce a controlled vibration or oscillation of the nozzle 20, which in turn causes a carefully controlled release of the powdered material feedstock from the nozzle 20. The controlled release may also simultaneously accomplish a mixing of two or more distinct types of powdered material feedstock. The excitation signal may also be an optical signal provided by an optical signal source, for example a laser, or an electrostatic signal, or even a thermal signal, which induces a slight vibration or oscillation of the nozzle 20. Each of these forms of excitation signals may be controlled in amplitude, and/or frequency and/or directional pointing of the excitation source 30, as well as through using simple On/Off control, to induce a highly controlled flow (or combined flow and mixing) of powdered material feedstock from the nozzle 20. Material flow may also be monitored, for example, by using acoustic transduction. This may enable one to identify an optimal resonance frequency.

Alternatively, a miniature speaker 30a (e.g., a piezoelectric speaker) may be placed inside the nozzle 20 and supplied with an electrical signal either from the electronic controller 12, or from the excitation source 30, or possibly wirelessly using the wireless communications subsystem 17. The electrical signal may be controllably varied in amplitude and/or frequency. In either instance, the speaker 30a, when energized, helps to cause a highly controlled release of the granular material feedstock from one or more of the reservoirs R1-R3.

Still another excitation source may involve a source similar to a cell phone "silent ringer" caused by controlled rotation of an eccentric mass. This rotation may be of controllable frequency, and may be made controllable in amplitude and direction of propagation if the eccentric mass or rotation of axis can be changed. Accordingly, it will be appreciated that the excitation source 30 is not limited to any one specific excitation method.

In the absence of the excitation signal, the powdered material feedstock in the nozzle 20 does not flow out from the nozzle. In this manner, the excitation signal can be used to control both the On/Off flow of powdered material feedstock onto the table 26 (or onto a previous material layer formed on the table 26), or even the quantity of powdered material feedstock (i.e., rate of flow of material per unit of time) that is released by the nozzle 20. Controlling both the On/Off flow, as well as the quantity of powdered material feedstock, enables the features of a given layer to be precisely patterned using the powdered material feedstock, rather than the powdered material feedstock simply being used to cover an entire area of a given layer of the 3D part. This highly precise "patterning" of powdered material feedstock to form each layer of a 3D part can also help to reduce the amount of powdered material that is wasted (i.e., not used) when forming each layer of the 3D part.

Referring further to FIG. 1, a setting subsystem 34 may be controlled by the electronic controller 12. The setting subsystem 34 may be used to perform a post-processing operation on the just-laid down powder material layer. The post-processing operation may be to apply a binder (e.g., polyvinylpyrrolidone, polyvinyl alcohol), using the setting subsystem 34, to the just-laid down powder layer before proceeding with deposition of a new powder layer. Alternatively, the post-processing operation may be to use the setting subsystem 34 to perform an in-situ sintering process using an optical signal, for example an optical signal from a laser or even electromagnetic energy (e.g., microwave energy) from a suitable energy source (e.g., flash lamp), which is controlled in amplitude, frequency, directional pointing, or through a combination of all of these factors. Still further, the setting subsystem 34 could be used to perform a setting operation substantially simultaneously with application of a binder. For example, the system 10 may be used with a heat-activated binder such as solder, or possibly even with a UV-curing adhesive. Accordingly, the present disclosure is not limited to any particular form of "setting" operation or technique, or to just performing a "post-processing" setting operation. The type of powdered material(s) used may be an important factor in the actual setting technique/operation that is performed by the setting subsystem 34. It is also possible that the setting subsystem 34 may perform applying a binder along with a sintering operation immediately after, or shortly after, the binder is applied.

The setting subsystem 34 may be controlled to "track" motion of the nozzle 20 or even motion of the table 26, if the table is being moved instead of the nozzle. This may be accomplished by "slaving" the setting subsystem 34 to movement of the nozzle 20, such as by using signals from the nozzle motion control subsystem 24, or possibly by using the setting subsystem 34 to "set" (e.g., sinter) an entire layer at once while it is held stationary.

Figure 2:
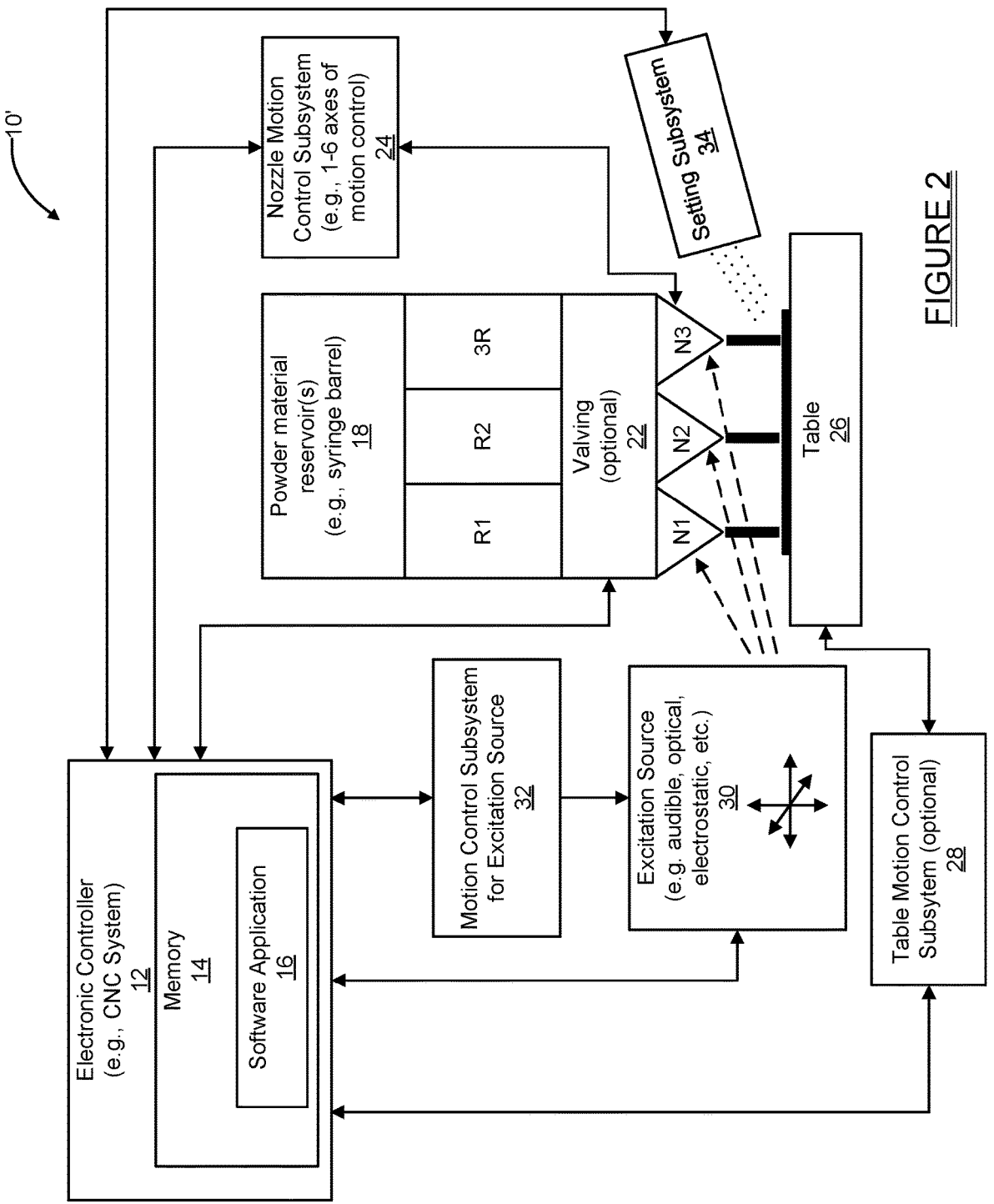
FIG. 2 is a high level block diagram showing another embodiment of a system in accordance with the present disclosure which makes use of a plurality of independently controllable nozzles, as well as a movable table.

Referring briefly to FIG. 2, another embodiment 10' of the system shown in FIG. 1 is illustrated. The system 10' is identical to the system 10 with the exception that independent nozzles N1, N2 and N3 are used. Reference numbers in common with those used in FIG. 1 are used to designate common components in the system 10' shown in FIG. 2.

Figure 3:
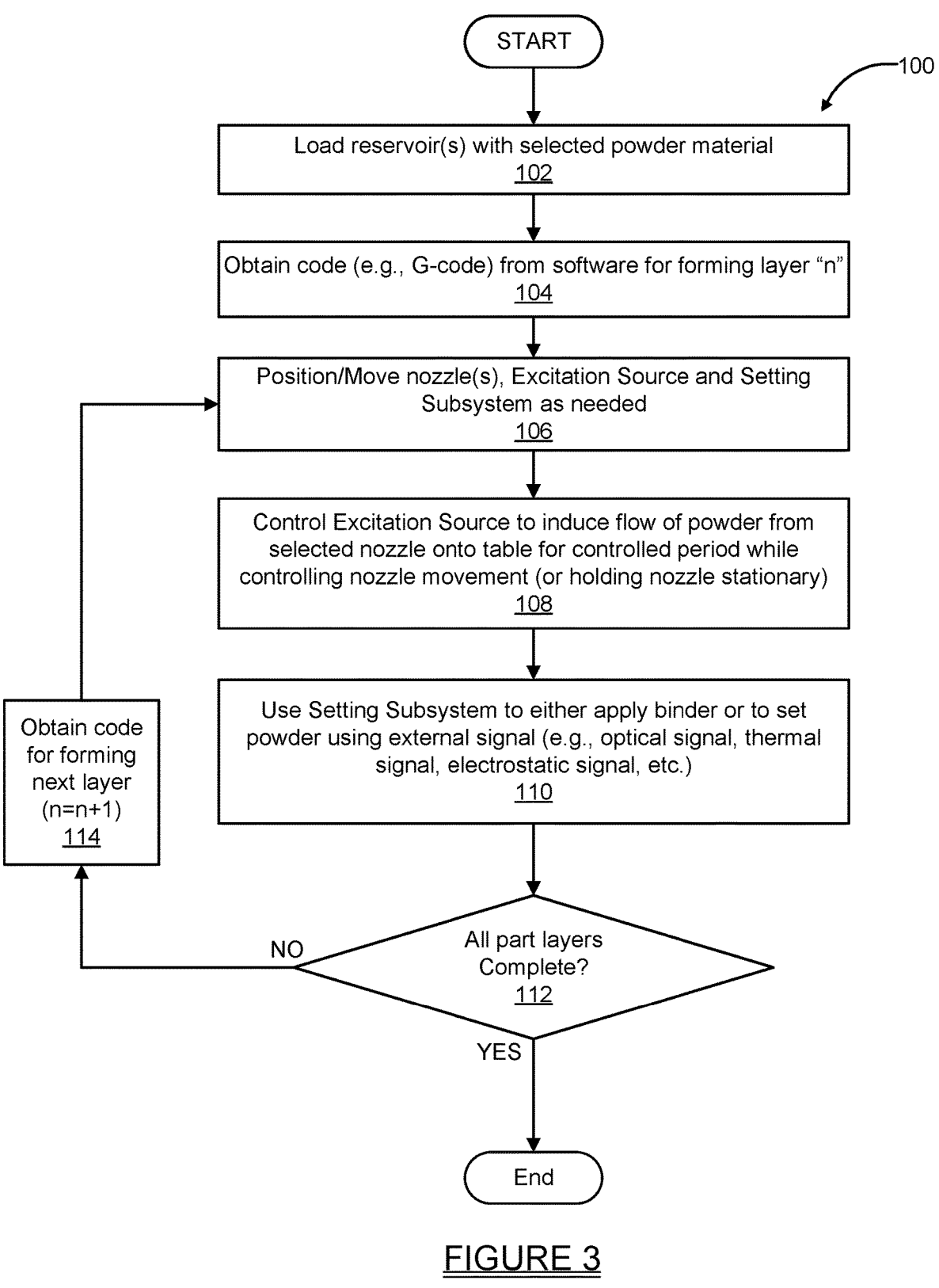
FIG. 3 is a high level flowchart illustrating operations that may be performed by the various embodiments of the present disclosure in forming a complete 3D part.

Another important advantage of the systems 10 and 10' is being able to control the printed feature size "on the fly". For example, one may picture a line of powder being deposited onto a surface while printing a layer of a part. At constant amplitude/frequency of the oscillating signal, the printed line will have a constant width. But when the oscillation amplitude and/or frequency are changed during the movement of the nozzle/surface, the printed line will change in width (and/or possibly in thickness as well). This change happens almost instantaneously. Accordingly, this provides the system 10 with the ability to change the printed feature size, in real time, in a continuous or discrete manner during the deposition which, in the understanding of the co-inventors, is a feature that no other present day AM technique offers Referring to FIG. 3, a flowchart 100 is shown setting forth various operations that may be performed by the system 10 (or system 10') in forming a complete 3D part. Initially one or more of the powder feedstock material reservoirs R1/R2/R3 may be loaded with dry powdered material feedstock, as indicated at operation 102. The reservoirs R1/R2/R3 may be formed by a cartridge, such as a syringe barrel, to which the nozzle 20 is affixed. We then add an excitation source that induces flow of the dry powder (also known as granular media).

At operation 104 the code (e.g., G-code) needed for forming a specific layer of the 3D part may be obtained by the electronic controller 12. At operation 106 the nozzle 20 (and/or table 26) may be positioned at a start point to begin forming a particular layer of the part, as indicated at operation 106. At operation 108, the excitation source 30 is controlled by the excitation motion control subsystem 32, and the nozzle 20 is controlled by the nozzle motion control subsystem 24, to cause deposition of the powdered material feedstock onto the table 26 for forming an initial layer of the part. As noted above, however, a single motion control subsystem 32a may be used to control motion of both of the nozzle and the excitation source 30. In either implementation, the powdered material feedstock is deposited in a highly controlled fashion as needed to form the features of the initial layer of the part.

At operation 110 the setting subsystem 34 may be controlled to either apply a binder to the just-deposited powdered material feedstock, or to set the powdered material feedstock using a suitable signal (e.g., optical signal, thermal signal, electrostatic signal, etc.). At operation 112 a check is made by the electronic controller 12 if all layers of the part are complete. If this check produces a "No" answer, then the code needed to form the next layer of the part is obtained, as indicated at operation 114, and operations 106-112 may be repeated. If the check at operation 112 indicates that all layers of the part are complete, then the part forming operation is complete.

Referring to FIGS. 4-7, a print nozzle assembly 200 in accordance with another embodiment of the present disclosure is shown. It will be appreciated that the print nozzle assembly 200 may simply be substituted in place of the nozzle 20, and may be used with all of the variations of the system 10 (e.g., amplitude and/or frequency control of excitation signal) described in connection with the system 10 and the nozzle 20. With specific reference to FIGS. 4-6, the print nozzle assembly 200 in this example includes a housing/printer connection 202 having an upper housing portion 202a and a lower housing portion 202b. The upper housing portion 202a may be supported from any suitable structure associated with the nozzle motion control subsystem 24 so that the nozzle assembly 200 may be moved over the table 26 (FIG. 1).

Figures 4, 5, 6:
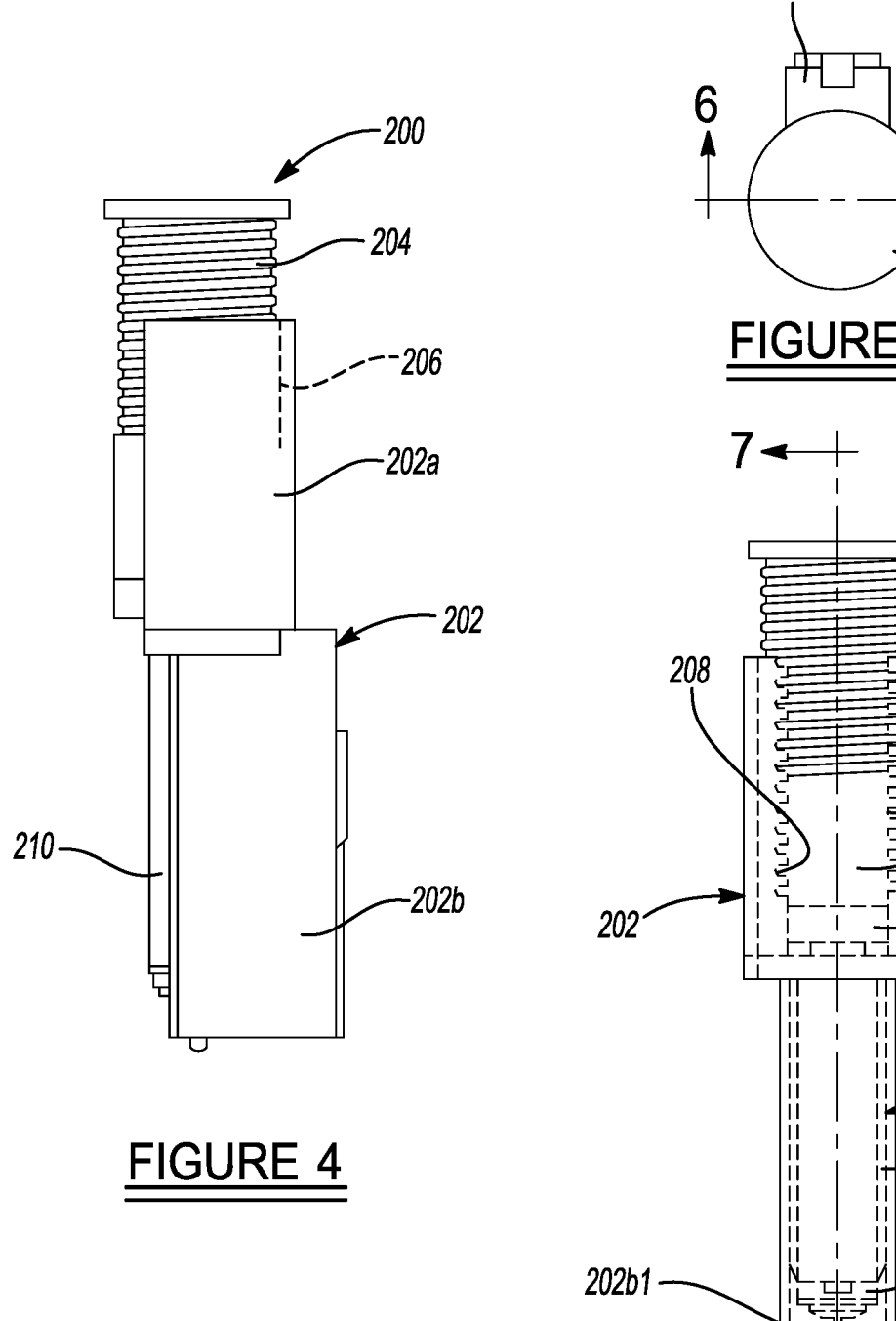
FIG. 4 is a perspective view of a print nozzle assembly in accordance with another embodiment of the present disclosure, wherein the print nozzle incorporates an internal rod which is able to be vibrated to help control dispensing of a powder feedstock material contained in a nozzle element.
FIG. 5 is a top plan view of the print nozzle assembly of FIG. 4.
FIG. 6 is side cross-sectional view of the print nozzle assembly of FIG. 5 taken in accordance with section line 6-6 in FIG. 5.
Figure 7:
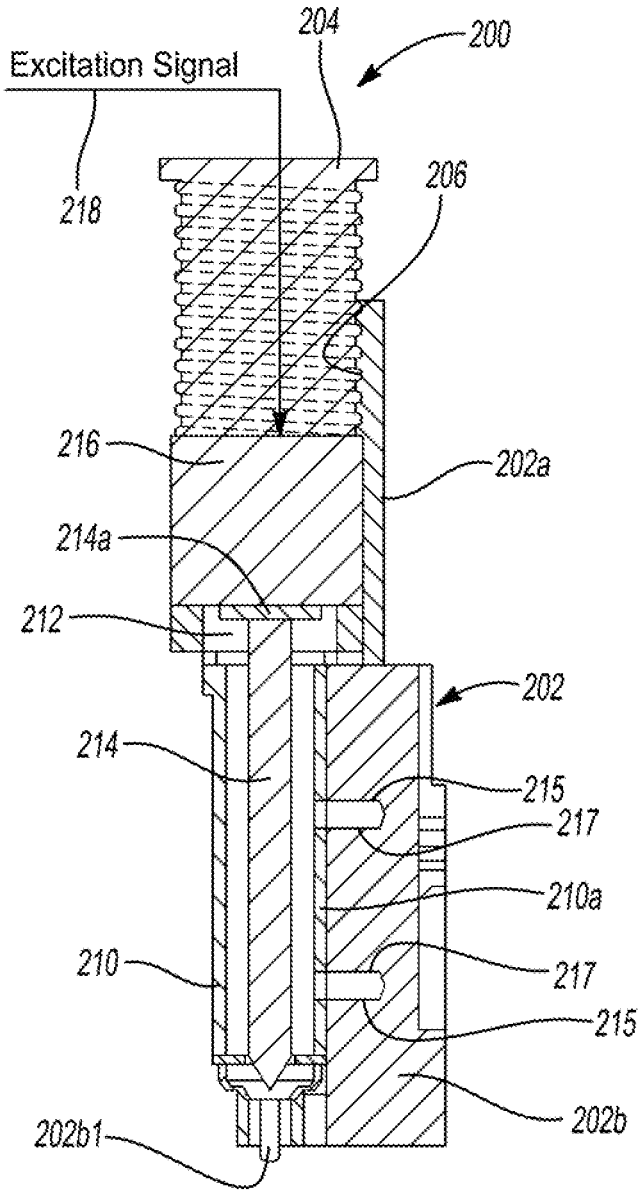
FIG. 7 is a side cross-sectional view of the print nozzle assembly of FIG. 6 taken in accordance with section line 7-7 in FIG. 6.

With reference to FIGS. 6 and 7, the upper portion 202a includes a threaded fastener/cap 204 which is at least partially seated in a threaded bore 206 in the upper portion. With reference to FIGS. 6 and 7, the threaded bore 206 helps to define an internal chamber 208 in which a syringe 210 is placed. The syringe 210 is used for holding the powdered (e.g., granular) material feedstock that is deposited on a work surface when creating a part in a layer-by-layer 3D printing operation. A sealing ring 212 is disposed at an upper end of the syringe 210. The syringe 210 communicates with a discharge port 202b1 formed in the lower housing portion 202b. The powdered material feedstock is discharged from the discharge port 202b1 and flows into a nozzle element 213 (shown in phantom in simplified diagrammatic form) onto a work surface. In one embodiment the nozzle element 213 is a conical-like component, although it need not be conically shaped, and may be attached by a threaded portion to an outer threaded surface 202b2 of the syringe 210, or attached by any other suitable means.

FIG. 7 shows another cross-sectional view of the print nozzle assembly 200 in accordance with section line 7-7 in FIG. 6. In this view it can be seen that the syringe 210 has positioned inside of it an element 214 for producing vibration. In this example the element 214 is an elongated rod, and will be referred to throughout the following description as the "elongated rod 214" merely for convenience. However, it will be appreciated that other shapes of elements besides an elongated rod-like shape may be used, and the exact shape of the element may depend in part on the shape of the syringe 210 and/or other factors.

An upper end of the elongated rod 214 includes an enlarged planar portion 214a and is positioned closely adjacent, or may actually be touching, a transducer 216. The enlarged planar portion 214a may rest on the sealing ring 212 or may be encapsulated within the sealing ring 212 as shown in FIG. 7. Post-like elements 215 project laterally from an outer housing 210a of the syringe 210 and fit into recesses 217 to help support the syringe 210 from the lower housing 202b. In one embodiment the transducer 216 may be a speaker element (hereinafter referred to as "speaker element 216" for convenience), and may be encased in a portion of the sealing ring 212. The sealing ring 212 may be a plastic spacer or any other suitable spacer to accommodate and position the speaker element 216 relative to the syringe 210. The sealing ring 212 could also be formed by an O-ring seal.

When the print nozzle assembly 200 is assembled, the elongated rod 214 will be projecting into the powdered material feedstock present in the syringe 210 and thus be in contact with the powdered material feedstock. The speaker element 216 may be fed with an electrical signal via signal line 218, or alternatively may be a speaker having wireless communication capability, such as a BLUETOOTH™ protocol enabled speaker, which is controlled using the wireless communications subsystem 17 (FIG. 1). In one embodiment the speaker element 216 may have an internal rechargeable battery, or optionally it may be powered remotely via power delivered by electrical conductors. In one embodiment the speaker element 216 comprises a piezoelectric speaker or a ribbon type speaker, although other forms of speakers may be used. Another type of speaker which may be used is a vibration or contact speaker. A vibration or contact speaker contains a movable plate connected to the electromagnetic "voice" coil. This plate makes contact with the target surface to transmit the vibrational energy. This differs from a typical piezoelectric speaker, which typically includes a diaphragm that deforms when a voltage is applied. It will also be appreciated that other forms of transducers may be used to impart energy to the rod 214. For example, the rod 214 could be coupled directly to a voice coil of a transducer. Accordingly, the nozzle assembly 200 is not limited to use with only an internally mounted speaker element for providing the energy to vibrate the rod 214. And also, the speaker 216 in this embodiment operates as the excitation source 30 of FIG. 1.

In operation, a suitable electrical signal fed to the speaker element 216 causes an acoustic signal to be imparted to the elongated rod 214. This causes a highly controlled vibration of the elongated rod 214 which in turn causes a highly controlled vibratory signal to be applied to the powdered material feedstock contained in the syringe 210. The vibratory motion imparted to the powdered material feedstock causes a highly controlled deposition of the feedstock through the discharge portion 202b1 onto the work surface (not shown). Typically, the discharge port 202b1 will be positioned typically within about 0.1 mm-0.5 mm of the work surface.

The system 10 and method described herein offers precise control over the stop and start behavior of the powdered material feedstock deposition. In the case of a speaker system excitation, as noted above, the flow conditions are affected by the frequency, amplitude and direction of the audio signal (e.g., vibration), among other things. Multimaterial printing can occur by harnessing multiple nozzles 20, implementation of active mixing of powders at various ratios, or by design of sophisticated print heads that mimic inkjet printing systems. Incorporation of valving systems into the nozzle/print-head is also possible. This process can be used to pattern 1D, 2D, and 3D parts.

The present system 10 and above-described method, in its various embodiments, may thus be used to rapidly print 3D objects having layers that have complex features. The system 10 can be incorporated into existing additive manufacturing platforms, especially those that depend upon powder bed processes. For example, the powder printing process can be deployed in addition to powder spreading, wiping, or other deposition processes for creating of layers of powders for powder bed-based AM processes. A setup containing a multiple-inlet, active mixing body (i.e., nozzle) can be used to generate a mixed powder output at varying relative concentrations of the components, thus enabling the printing of structures with material concentration gradients that may differ throughout the structure. In one embodiment, gravity is used to assist with pulling the powders out of the nozzle 20, although the use of gravity is not essential. The powdered material feedstock may be slightly pressurized within the powdered material feedstock reservoir to assist with printing into directions that are not aligned with the force of gravity. For example, the embodiments of the system 10 described herein may be used to print onto surfaces that are coated with adhesive. In subsequent steps, the patterned powder may be further processes. For example, a laser, laser diode with optically addressable light valve, or electron beam could be used to heat treat, sinter, densify, and/or anneal the powder. In another example, an inkjet print head could be used to bind the powder to create a patterned green body. Optionally, the entire powder bed could be treated with thermal post-processing steps, among others.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. A method for additively manufacturing a part, the method comprising:
    providing an excitation source configured to generate a signal;
    using a reservoir to hold a granular material feedstock;
    using a nozzle in communication with the reservoir to release the granular material feedstock in a controlled fashion from the reservoir to form at least one layer of the part; using a syringe located within the nozzle to receive the granular material feedstock;
    arranging an elongated element within the syringe;
    using the elongated element disposed within the syringe, and within the granular material feedstock, to agitate the granular material feedstock;
    providing a transducer arranged adjacent to one end of the elongated element disposed within the syringe within the nozzle, the transducer responsive to the signal from the excitation source; and the signal from the excitation source exciting the transducer to cause the elongated element to induce a controlled release of the granular material feedstock from the nozzle as needed to pattern the granular material feedstock as necessary to form a layer of the part.

2. The method of claim 1, further comprising using a setting subsystem configured to emit at least one of:
    a binder which is applied to the patterned granular material feedstock; or
    an optical signal which is used to heat the patterned granular material feedstock before a new layer of granular material feedstock is deposited.

3. The method of claim 1, wherein using an excitation source for applying a signal to the nozzle comprises using an excitation source to generate an acoustic signal.

4. The method of claim 1, wherein using the excitation source for applying a signal to the elongated element within the nozzle comprises using a mechanical signal.

5. The method of claim 1, wherein the elongated element disposed within the nozzle comprises an elongated rod for providing a controlled, vibratory mechanical signal to the granular material feedstock to assist in controlling release of the granular material feedstock from the nozzle in response to the signal generated from the excitation source.

6. The method of claim 1, wherein using an excitation source comprises using a transducer operably associated with the nozzle to provide the signal which causes the controlled, vibratory mechanical signal produced by the element.

7. The method of claim 1, wherein using an excitation signal comprises using s speaker to generate an acoustic signal, and wherein at least one of an amplitude, a frequency, or a direction of propagation of the acoustic signal is controlled to accomplish setting of the patterned granular material feedstock.

8. The method of claim 1, wherein using an excitation source comprises using a laser.

9. The method of claim 1, wherein using an excitation source comprises using a source that generates at least one of an electrostatic signal or an electromagnetic signal.

10. The method of claim 1, wherein using an excitation source comprises using an excitation source that generates a thermal signal.

11. The method of claim 1, further comprising using an electronic controller to control the excitation source to release the granular material feedstock in a manner to pattern the granular material feedstock as needed to form the layer of the part.

12. The method of claim 1, further comprising using a motion control subsystem to move the excitation source.

13. The method of claim 1, further comprising using a nozzle motion control subsystem for controlling movement of the nozzle while the granular material feedstock is being released from the nozzle.

14. The method of claim 1, further comprising a motion control subsystem for controlling motion of a table onto which the granular material feedstock is released from the nozzle while the granular material feedstock is flowing out from the nozzle.

15. A method for additively manufacturing a part, the method comprising:

using a reservoir to hold a granular material feedstock;

using a nozzle in communication with the reservoir to release the granular material feedstock in a controlled fashion from the reservoir to form at least one layer of a part;

using an electronic controller to control an excitation source, the excitation source generating at least one least one of an electrostatic signal or an electromagnetic signal to the nozzle which induces a controlled release of the granular material feedstock from the nozzle as needed to pattern the granular material feedstock as necessary to form a layer of the part; using an element disposed within the nozzle for providing a controlled, vibratory mechanical signal to the granular material feedstock to assist in controlling release of the granular material feedstock from the nozzle in response to the signal generated from the excitation source;

using a syringe located within the nozzle to receive the granular material feedstock and controllably release the granular material feedstock; and providing a transducer arranged adjacent to one end of the element disposed within the syringe within the nozzle, wherein the transducer is responsive to the signal from the excitation source;

wherein the signal from the excitation source excites the transducer to cause the element to induce the controlled release of the granular material feedstock from the nozzle as needed to pattern the granular material feedstock as necessary to form a layer of the part.

* * * * *